No. 875,126. PATENTED DEC. 31, 1907.
E. A. SMITH.
BEET PULLER.
APPLICATION FILED APR. 18, 1907.
2 SHEETS—SHEET 1.
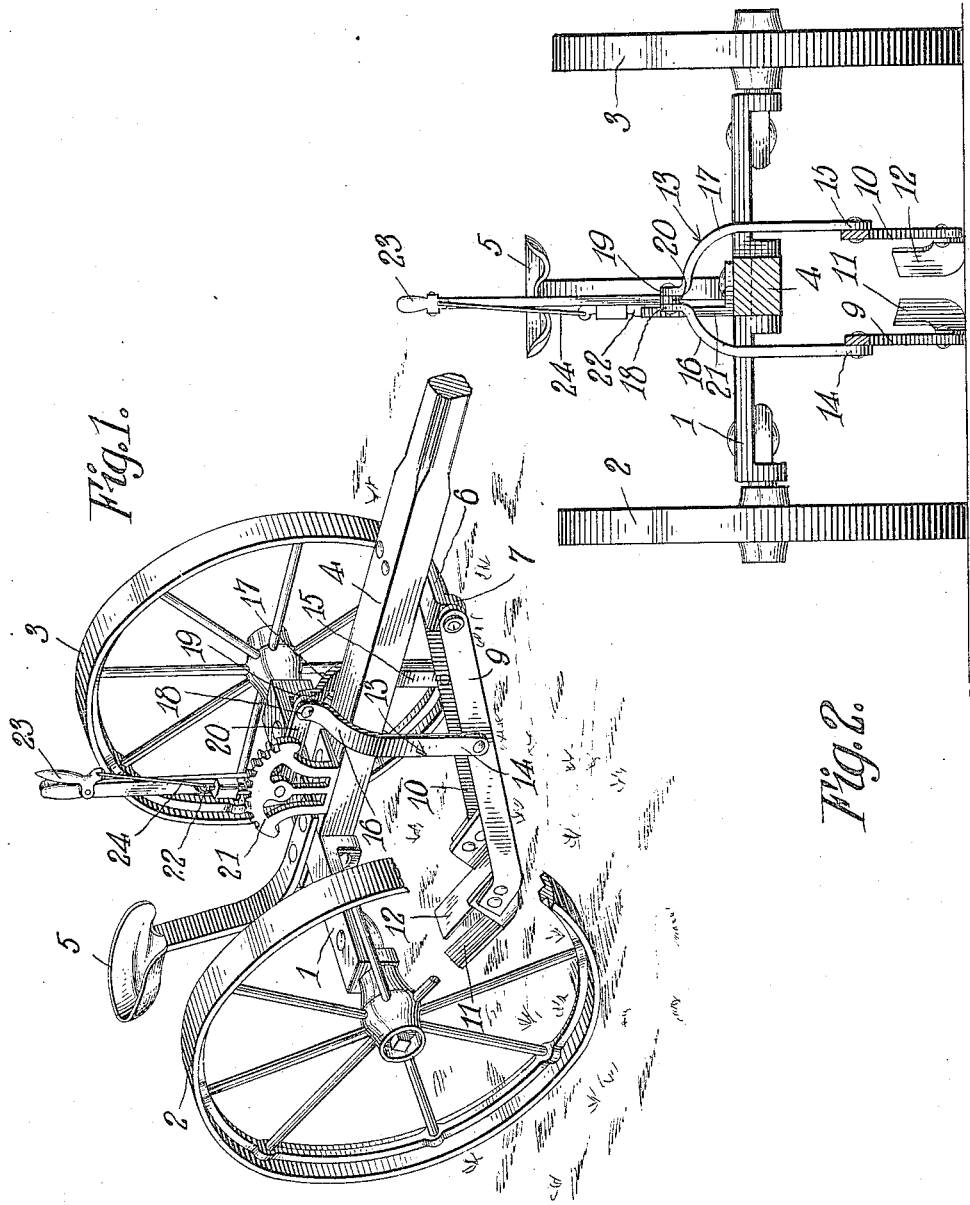
Witnesses
C. E. Smith.
C. H. Griesbauer.
Inventor
Edward A. Smith.
by H. B. Willson & Co.
Attorneys

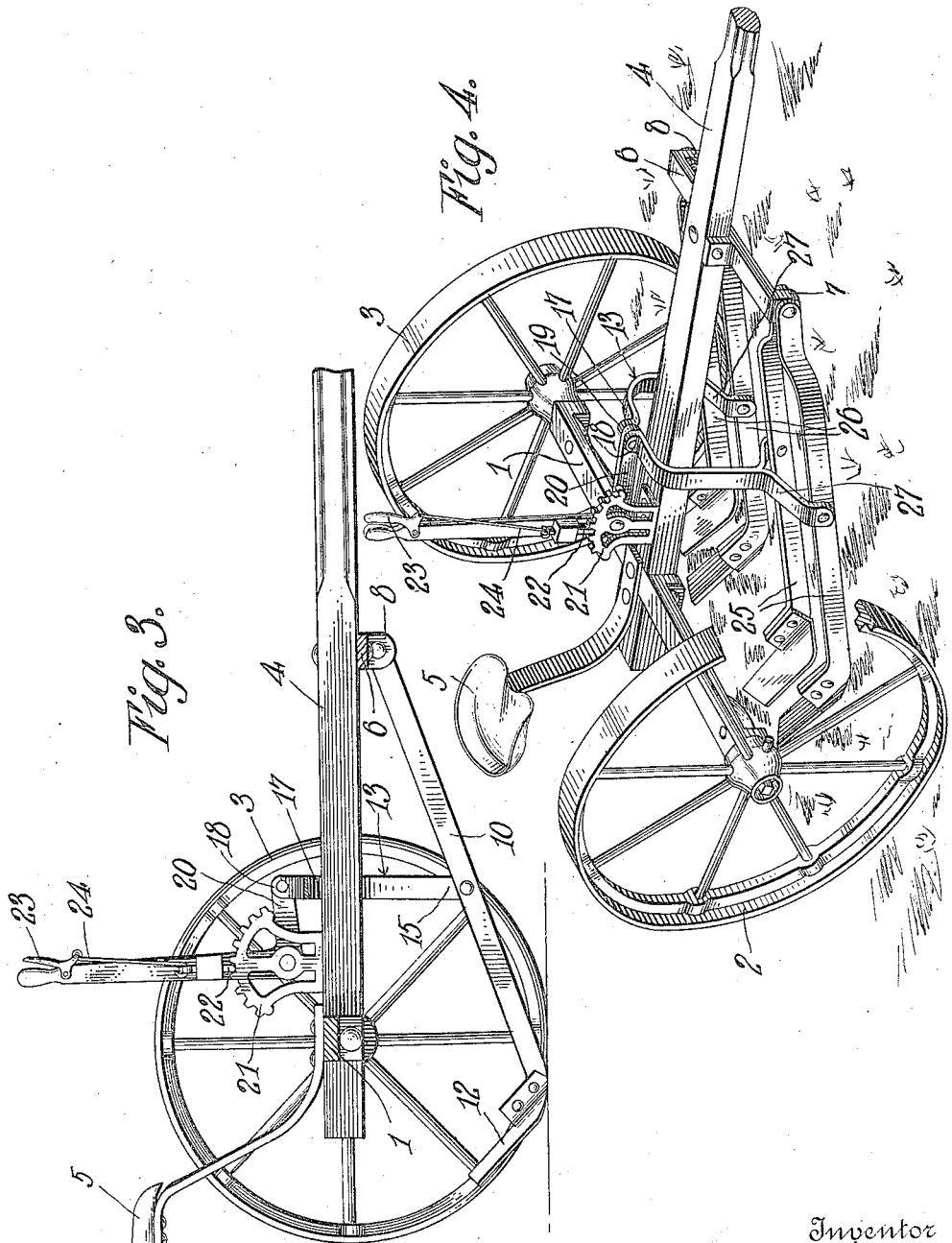

UNITED STATES PATENT OFFICE.

EDWARD A. SMITH, OF LOVELAND, COLORADO.

BEET-PULLER.

No. 875,126.  Specification of Letters Patent.  Patented Dec. 31, 1907.

Application filed April 18, 1907. Serial No. 368,928.

*To all whom it may concern:*

Be it known that I, EDWARD A. SMITH, a citizen of the United States, residing at Loveland, in the county of Larimer and State of Colorado, have invented certain new and useful Improvements in Beet-Pullers; and I do declare the following to be a full, clear, and exact description of the invention, such as will enable others skilled in the art to which it appertains to make and use the same.

This invention relates to an improved beet puller or plow.

The object of the invention is to provide an improved two-wheeled beet puller which is simple, inexpensive and efficient and which when drawn over the field will first pull the beets out of the ground and then discharge them ready to be gathered.

In the accompanying drawings,—Figure 1 represents a perspective view of this improved beet puller with the tongue broken off; Fig. 2 represents a transverse section thereof; Fig. 3 represents a longitudinal vertical section; and Fig. 4 represents a perspective view of a slightly modified form of beet-puller.

In the embodiment illustrated in Figs. 1 to 3, a two-wheeled beet puller is shown constructed of a cross bar 1 having sub-shafts at its opposite ends on which are mounted traction wheels 2 and 3. Secured to this bar 1 is a tongue 4 and a spring seat 5. Attached to the underface of the tongue is a short cross bar 6 having its ends 7 and 8 down-turned and provided with apertures. Pivotally mounted in these down-turned ends 7 and 8 are two puller beams 9 and 10 having their rear ends extended upwardly and to which are bolted puller bars 11 and 12. An inverted U-shaped yoke member 13 straddles the tongue and has its ends 14 and 15 pivotally connected with the puller beams 9 and 10 midway of their length. This yoke member 13, as shown, is composed of two bow-shaped arms 16 and 17 having their upper ends 18 and 19 bent to form a clamp between which is loosely pivoted the free end of the short arm of a bell-crank lifting lever 20. Bolted to the tongue adjacent to the cross bar 1 is a segmental rack 21 to which the bell-crank lever 20 is fulcrumed. A spring-pressed dog or pawl 22 is mounted on the lever 20 in position to engage the rack 21. A smaller L-shaped bell-crank lever 23 is mounted on the long arm of the bell-crank 20, and the short arm of this lever 23 is connected by a rod 24 with the dog 22, whereby when the long arm of the lever 23 is depressed the dog is lifted out of engagement with the rack 21 and the puller bars 11 and 12 may be raised or lowered as desired. These bars 11 and 12 are adapted to lift the beets out of the ground and free them from the soil, and they then pass over the ends of the puller bars and drop on to the ground ready to be picked up.

The form shown in Fig. 4 is similar in construction to the form shown in Figs. 1 to 3, except that the plow is here shown provided with two sets of puller bars, as 25 and 26, each pair being secured to the opposite ends of the short crank bars 6, and the ends of the yoke 13 are bifurcated, as at 27, and pivoted to the puller beams.

I claim as my invention:—

1. A beet puller comprising a frame having supporting wheels, a tongue secured thereto, a cross bar secured to said tongue and having its opposite ends down-turned, puller beams pivotally connected with said down-turned ends, and having upwardly-inclined puller bars at their free ends, an inverted U-shaped yoke straddling said tongue and having its ends pivoted to said puller beams, and means connected with said yoke for raising and lowering the puller bars.

2. In a beet puller the combination of a frame having supporting wheels, a tongue secured thereto, a cross bar secured to said tongue, puller beams hinged to said cross bar and having their outer ends inclined upwardly, puller bars secured to said inclined ends, a yoke pivoted to said puller beams, and a bell-crank lever mounted on said tongue and connected with said yoke, and means for locking said lever in adjusted position for raising and lowering the puller bars.

In testimony whereof I have hereunto set my hand in presence of two subscribing witnesses.

EDWARD A. SMITH.

Witnesses:
 EDWARD B. SMITH,
 T. H. ROBERTSON.